United States Patent [19]

Rood

[11] Patent Number: 5,255,406

[45] Date of Patent: Oct. 26, 1993

[54] ADJUSTABLE BARBEQUE GRILL SCRAPER

[76] Inventor: Brenda A. Rood, 537 Third St. SE., Valley City, N. Dak. 58072

[21] Appl. No.: 988,595

[22] Filed: Dec. 10, 1992

[51] Int. Cl.⁵ ............................................. A47J 49/00
[52] U.S. Cl. ............................ 15/236.06; 15/236.08; 15/236.09
[58] Field of Search ........... 15/236.06, 236.09, 236.05, 15/236.08

[56] References Cited

U.S. PATENT DOCUMENTS

| | | | |
|---|---|---|---|
| 2,824,323 | 2/1958 | Tos et al. | 15/105 |
| 3,800,354 | 4/1974 | Stephens | 15/236.06 |
| 3,820,185 | 6/1974 | Phillips | 15/105 |
| 4,112,537 | 9/1978 | Heuck | 15/105 |
| 4,146,943 | 4/1979 | Wertheimer et al. | 15/236.06 X |
| 4,229,032 | 10/1980 | Murphy | 15/236.06 X |
| 4,282,625 | 8/1981 | Hulett | 15/236.06 |
| 4,958,403 | 9/1990 | Martin | 15/236.07 |

*Primary Examiner*—Chris K. Moore
*Attorney, Agent, or Firm*—Henderson & Sturm

[57] ABSTRACT

An adjustable barbeque scraper (10) for removing accumulated deposits from a variety of barbeque grills (100) having different spacing between their rods (101); wherein the adjustable scraper (10) includes a plurality of individual scraper tooth members (30) which are laterally adjustable relative to one another and the head portion (22) of the main body member (20) of the scraper (10).

6 Claims, 1 Drawing Sheet

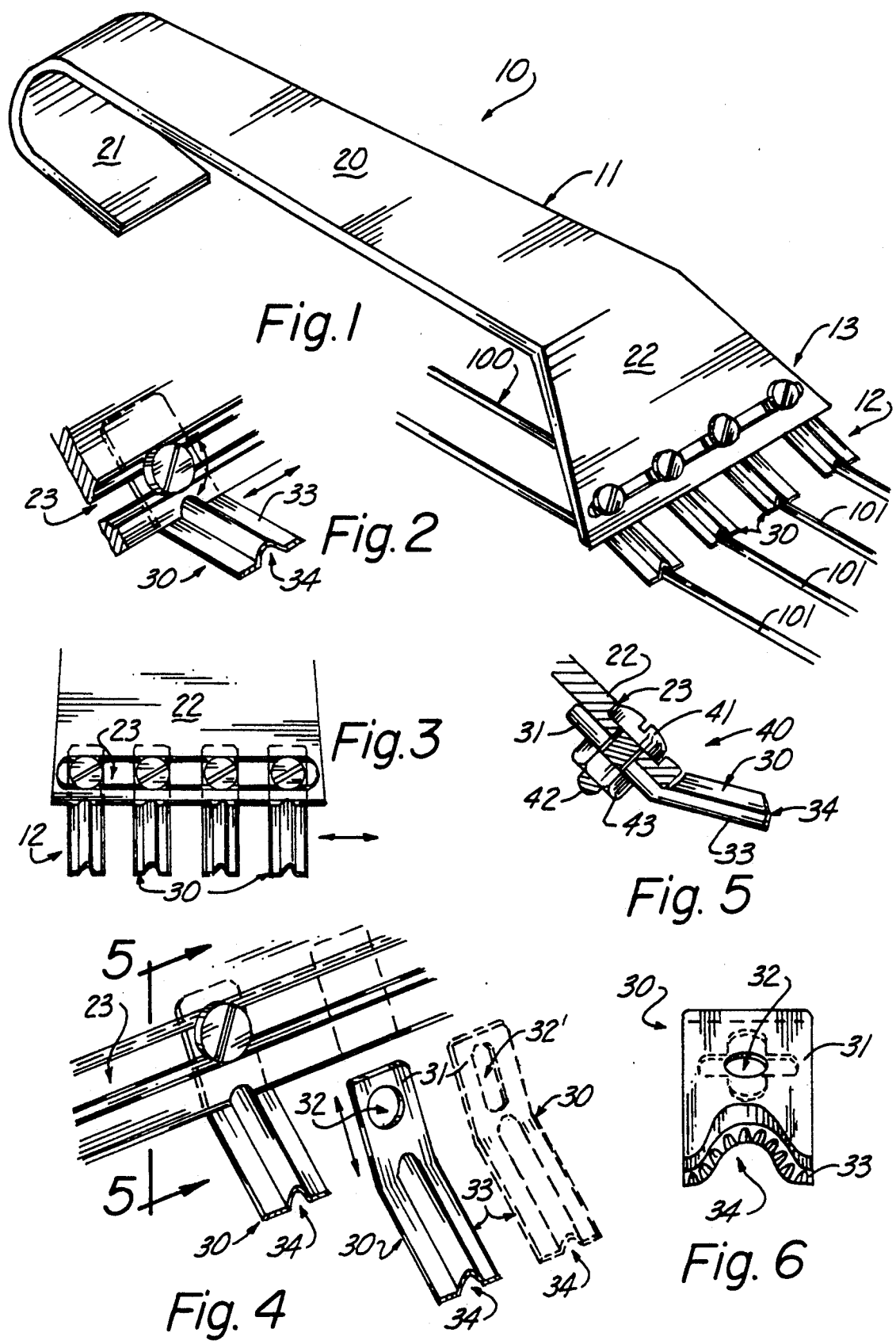

ADJUSTABLE BARBEQUE GRILL SCRAPER

TECHNICAL FIELD

The present invention relates to the field of barbeque grill scraping and cleaning implements in general, and in particular to an adjustable barbeque grill scraper; wherein the spacing between the scraper teeth may be varied to accommodate variously configured barbeque grills.

BACKGROUND ART

This invention was the subject matter of Document Disclosure Program Registration No. 290862 and 311712 which was filed in the United States Patent and Trademark Office respectively on Sep. 6, 1991, and Jun. 24, 1992.

As can be seen by reference to the following U.S. Pat. Nos. 3,820,108; 4,958,403; 4,112,537; and 2,824,323; the prior art is replete with myriad and diverse barbeque grill cleaning and scraping implements.

While all of the aforementioned prior art constructions are more than adequate for the basic purpose and function for which they have been specifically designed, these scraping devices in particular are uniformly deficient with regard to the fact that they do not provide individual teeth to firmly scrape the upper surface of all types and sizes of barbeque grills.

The simple reason for this widespread oversight is based on the fact that to date no one has devised a universal toothed barbeque grill scraper, that can effectively clean the top surface of a barbeque grill due to the final position of scraper teeth which will only allow the scraper to accommodate a single grill configuration.

As a consequence of the foregoing situation, there has existed a longstanding need for an adjustable barbeque grill scraper wherein the spacing between the individual scraper teeth may be varied to accommodate grill surfaces having different configurations; and, the provision of such a construction is a stated objective of the present invention.

DISCLOSURE OF THE INVENTION

Briefly stated, the adjustable barbeque grill scraper that forms the basis of the present invention comprises in general a main body unit having a handle portion formed on one end and a head portion formed on the other end.

In addition, the head portion of the main body unit is operatively connected to a plurality of individual tooth units by adjustment means that permit the spacing between each of the adjacent tooth units to be varied to accommodate barbeque grills having different configurations.

In addition, as will be explained in greater detail further on in the specification, an alternate version of the preferred embodiment contemplates that each of the tooth units is designed so as to be both laterally and vertically adjustable relative to the head portion of the body unit; such that the tooth units may be equally spaced relative to one another in a staggered fashion, so as to present an angled scraping surface relative to the top of that grill if so desired.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the adjustable barbeque grill scraper that forms the basis of the present invention;

FIG. 2 is an isolated perspective view of the engagement of one of the tooth units with the head portion of the body unit;

FIG. 3 is an isolated top view of the preferred uniform alignment of the scraper teeth relative to the head portion of the body unit;

FIG. 4 is an exploded perspective view of the engagement of the scraper teeth with the head portion of the body unit.

FIG. 5 is a cross-sectional view taken through line 5—5 of FIG. 4; and,

FIG. 6 is an isolated front elevation view of one of the tooth units.

BEST MODE FOR CARRYING OUT THE INVENTION

As can be seen by reference to the drawings, and in particular to FIG. 1, the adjustable barbeque grill scraper that forms the basis of the present invention is designated generally by the reference numeral (10). The barbeque grill scraper (10) comprises in general a main body unit (11), a plurality of individual scraper tooth units (12) and securing means (13) for operating and adjustable connecting the individual scraper tooth units (12) to the main body unit 13. These units will now be described in seriatim fashion.

As can best be seen by reference to FIG. 1, the main body unit (11) comprises an elongated generally rigid body member (20) having a current handle portion (21) formed on one end and a downwardly angled head portion (22) formed on the other end.

In addition, as shown in FIGS. 1 through 4, the head portion (22) is further provided with an elongated transverse stepped shoulder slot (23) which is disposed proximate to, but spaced from the outboard end of the head portion (22) of the body member (20).

As shown in FIGS. 2 through 6 each of the plurality of individual scraper tooth units (13) comprise a generally rigid scraper tooth member (30); having a generally flat angled upper arm portion (31) provided with an aperture (32). In addition, each scraper tooth member has a contoured lower arm portion (33) disposed at a fixed angle relative to the upper arm portion (31); wherein the lower arm portion (33) is provided with a longitudinally aligned recess (34), which is dimensioned to receive and engage at least the upper periphery of one of the rods (101) of a barbeque grill (100) for the forcible removal of accumulated deposits therefrom.

As can best be seen by reference to FIG. (5), the securing means (13) comprises: a plurality of threaded fasteners (40) having an enlarged slotted head (41) dimensioned to be loosely received in the stepped shoulder slot (23) in the head portion (22) of the main body member (20); wherein, each slotted head (41) has a threaded shaft (42) dimensioned to be received in the aperture (32) of each scraper tooth member (30) and be engaged by a threaded nut (43) for operatively securing the tooth members (30) to the main body member (30).

By this joint it should be appreciated that in the preferred embodiment of the invention illustrated in solid lines in FIGS. 2 through 5, each of the individual tooth members (30) are only intended to be laterally adjustable relative to the head portion (22) of the main body member (20) so as to adjust the spacing between the individual scraper tooth members (30) to accommodate the spacing between the rods (101) on a given barbeque grill (100).

However, as can be seen in the dashed line portion of FIG. 4, this invention also contemplates that there will be certain instances; wherein, a vertical adjustment of the scraper tooth members (30) relative to the head portion (22) of the main body member (20) may be desirable. As a consequence, this invention envisions that there will be instances wherein a vertically elongated aperture (32') would be preferable to the laterally elongated aperture (32) formed in the upper arm portion (31) of each scraper tooth member (30); in order to accomplish the vertical adjustment objective.

Having thereby described the subject matter of the present invention, it should be apparent that many substitutions, modifications and variations of the invention are possible in light of the above teachings. It is, therefore, to be understood that the invention as taught and described herein is only to be limited to the extent of the breadth and scope of the appended claims.

What is claimed is:

1. An adjustable barbeque grill scraper for use with a variety of barbeque grills having different spacing between the rods that comprise the upper surface of the barbeque grill wherein the barbeque grill scraper comprises:

an elongated generally rigid main body member having a handle portion and a head portion;

a plurality of individual scraper tooth members operatively and adjustable secured to the head portion of the main body member for relative movement in at least the lateral plane both between the individual scraper tooth members relative to one another and the individual scraper tooth members relative to the main body member; and securing means for captively engaging the individual scraper tooth members at a desired location relative to the main body member.

2. The adjustable barbeque grill scraper as in claim 1; wherein, the head portion of the main body member is provided with an elongated transverse aperture dimensioned to receive at least a portion of said securing means.

3. The adjustable barbeque grill scraper as in claim 2; wherein, each individual scraper tooth member includes a contoured lower arm portion provided with a longitudinal recess dimensioned to receive and engage at least the upper periphery of one of the rods of the barbeque grill.

4. The adjustable barbeque grill scraper as in claim 3; wherein, each individual scraper tooth member further includes a generally flat upper arm portion disposed at a fixed angle relative to the lower arm portion, and further provided with an aperture dimensioned to receive at least a portion of said securing means.

5. The adjustable barbeque grill scraper as in claim 4; wherein, said aperture in the upper arm portion of each scraper tooth member has a generally circular configuration.

6. The adjustable barbeque grill scraper as in claim 4; wherein, said aperture in the upper arm portion of each scraper tooth member has a generally elongated configuration.

* * * * *